Patented Oct. 4, 1932

1,880,516

UNITED STATES PATENT OFFICE

FRIEDRICH WILHELM STAUF, OF COLOGNE-DEUTZ, AND HERMANN HAGENEST, OF WIESDORF-ON-THE-RHINE, GERMANY, ASSIGNORS TO WINTHROP CHEMICAL COMPANY, INC., OF NEW YORK, N. Y., A CORPORATION OF NEW YORK

ORGANIC CUPRIC CYANOGEN COMPOUNDS

No Drawing. Application filed September 10, 1929, Serial No. 391,695, and in Germany October 31, 1928.

The present invention relates to cupric cyanogen compounds.

The new products of the probable formula:

$$Cu(CN)_2.A$$

wherein A designates a basic reacting nitrogen containing organic compound are manufactured by treating a mixture of a water-soluble cyanide and of about the equivalent quantity of a basic reacting, nitrogen containing, organic compound with the equivalent quantity of an aqueous solution of a cupric salt at a low temperature, say between about 0–20° C. As water-soluble cyanides we prefer to use potassium- and sodium cyanide and as cupric salt, cupric sulfate. As organic, nitrogen compounds containing groups of a basic character we use for instance, methylamine, ethylenediamine, urea, guanidine, aniline, pyridine, piperidine and the like.

Thus are produced water-insoluble compounds of divalent copper with hydrocyanic acid and an organic basic nitrogen compound. After filtration and drying, stable compounds of green and blue color are obtained, which in consequence of their copper content, their high cyanogen content and the kind of the organic group, as also on account of their marked dusting properties are suitable materials for combating insect pests.

The invention is illustrated by the following examples, without being limited thereto:

*Example 1*:—25 parts by weight of copper sulfate are dissolved in 100 parts by weight of water. This solution is added to an ice cold aqueous solution of 13 parts by weight of potassium cyanide and 6 parts by weight of urea in 25 parts by weight of water. A dark green colored monourea cupric cyanide of the probable formula:

$$Cu(CN)_2.NH_2CONH_2 \text{ is precipitated.}$$

*Example 2*:—25 parts by weight of copper sulfate are dissolved in 100 parts by weight of water. This solution is added to an ice cold aqueous solution of 13 parts by weight of potassium cyanide and 9 parts by weight of pyridine in 25 parts by weight of water. A green colored compound of mono-pyridine-cupric-cyanide of the probable formula:

$$Cu(CN)_2.C_5H_5N \text{ is produced.}$$

We claim:

1. The complex compounds of the probable formula:

$$Cu(CN)_2.A$$

wherein A designates an organic, basic reacting, nitrogen containing compound, being in the dry state blue to green colored water-insoluble powders, and being suitable dusting materials for combating insect pests.

2. The complex compound of the formula:

$$Cu(CN)_2.C_5H_5N$$

being in the dry state a green colored water-insoluble powder, and being a suitable material for combating insect pests.

3. The complex compound of the formula:

$$Cu(CN)_2NH_2.CO.NH_2$$

being in the dry state a dark green colored water-insoluble powder and being a suitable material for combating insect pests.

In testimony whereof, we affix our signatures.

FRIEDRICH WILHELM STAUF.
HERMANN HAGENEST.